UNITED STATES PATENT OFFICE.

LEONARD ROBERTS COATES, OF BALTIMORE, MARYLAND.

METHOD OF PRODUCING FERTILIZERS.

947,798.  Specification of Letters Patent.  Patented Feb. 1, 1910.

No Drawing.   Application filed May 14, 1909. Serial No. 495,872.

*To all whom it may concern:*

Be it known that I, LEONARD ROBERTS COATES, of the city of Baltimore and State of Maryland, have invented an Improved Method of Producing a Fertilizer and Applying the Same, of which the following is a specification.

In my application for an improved method of producing a fertilizer, Serial No. 492,287, filed on the 26th day of April, 1909, I have stated in substance, that the invention is based on the discovery made by me, that the insoluble salts of phosphorus, potash and lime are rendered available for the support of plant life by micro-organisms in natural processes constantly taking place; that the object of the said invention is to produce a commercial fertilizer in which is incorporated the said micro-organisms together with a suitable food for the same, which micro-organisms when the fertilizer is applied to the soil, will carry out, with respect to the insoluble salts present, the processes above described, that is to say,—the rendering available for plant food of any of the said insoluble salts with which the said micro-organisms come in contact. That the micro-organisms which effect the result above described are found in breaking-down rock, and although I am not prepared to give to a certainty the exact class to which they belong, it is probable that they are the bacilli *Proteus vulgaris* (Hauser) and classified under the heading, "Non-pathogenic bacilli; liquefying," in Sternberg's *Text Book of Bacteriology*, New York, 1901. That in carrying out the said invention, I take a sterilized culture-mixture, preferably an aqueous solution of sugar and phosphate of potash, which is well adapted to promote the life and multiplication of bacteria, and to this I add, breaking-down rock, carrying therewith the micro-organisms which in a natural process are effecting the changes above referred to; or the same micro-organisms wherever found in an active state and not materially contaminated by or mixed with other organisms which are found to be deleterious to their reproduction, or injurious to plant life when incorporated in a fertilizer. That I then take ground raw bone or some other suitable food for bacteria, and after sterilizing the same moisten it with the pure culture above described. By this process I produce a concentrated fertilizer composed of a sterilized food which is inoculated with the micro-organisms which when applied to the soil will attack the particles of rock containing one or more of the insoluble salts enumerated, and which is not contaminated with micro-organisms which have been found to be deleterious to bacterial life, or plant growth, and commonly propagated in soil when stable manure is applied thereto. That soil taken from one farm or situation, like stable manure, may contain micro-organisms which in accordance with the said invention are used for the purpose of increasing fertilization, but which may be infected by some plant disease and should such soil be transferred to another farm or situation, germs of the said disease may be carried with it; and it has been urged by persons who have scientifically experimented with soils, that the practice of using stable manure, and the transfer of soil from one farm or section of land to another, are operations which should be performed with great caution and with a full knowledge of the constitutents of the stable manure, or the soil transferred.

From the foregoing it will be understood that a fertilizer produced in the manner described contains only such micro-organisms as are adapted to render available the insoluble salts of phosphorus, potash and lime, together with a previously sterilized food which not only sustains the life of the micro-organisms contained in the fertilizer, but also those produced by their multiplication in the soil.

In my application for an improvement in fertilizers, and the method of producing the same, Serial No. 492,288, filed April 26, 1909, I have quoted largely from the specification forming a part of my application, Serial No. 492,287, and state that it is well known that another class of micro-organisms are essential to plant life, viz., those which gather and fix nitrogen from the air, and which are believed to belong to the class known as *Pseudomonas radicicola*. I also state that the said invention is for the purpose of carrying out simultaneously both of the said processes of fertilization, and with this in view I produce a commercial fertilizer as follows: I take a sterilized culture mixture, preferably, an aqueous solution of sugar and phosphate of potash which is well adapted to promote the life and multiplication of bacteria, and to this I add breaking-down rock carrying therewith micro-organisms which in natural processes are effecting the changes in the insoluble salts before mentioned, and which probably are the bacilli *Proteus vulgaris* (Hauser) and classified under the heading, "Non-pathogenic bacilli; liquefying;" and also add to the said culture mixture a pure culture of the micro-organisms having their habitat in the nodules of leguminous plants, and generally believed to belong to the class of *Pseudomonas radicicola*. I also state that the said micro-organisms above specified are found not to be antagonistic or incompatible with respect to each other, and when the same are in the presence of a suitable food they will perform their distinctive functions for an indefinite period. I further state that I then take ground raw bone or some analogous food for bacteria and, after sterilizing the same, moisten it with the pure culture of the classes of micro-organisms before referred to, and thereby produce a concentrated fertilizer which contains only the classes of micro-organisms which I believe to be necessary for the fertilization of arid lands, or the improvement of lands which have become impoverished by the exhaustion of plant-food-producing micro-organisms.

In my application for an improved method of producing antitoxins and applying the same to soils, Serial No. 492,289, filed April 26th, 1909, I have stated substantially as follows: That by investigation I have discovered that in many cases want of fertility in soils is due not so much to paucity therein of micro-organisms adapted to abstract nitrogen from the air and fix the same in plants, or of those micro-organisms which as stated in my application, Serial No. 492,287, filed on the 26th day of April, 1909, render available for plant food the insoluble salts of phosphorus, potash and lime, but from toxins consisting wholly or in part of emanation from or the excrement voided by the said micro-organisms or given off by the plants either independently of or in connection with such micro-organisms. That in my researches I have discovered that the toxins above referred to are rendered harmless by certain bacteria of putrefaction; but as there are found in decomposing animal matter various species of micro-organisms too numerous to mention, it is impossible for me, at this time, to specify the particular class or classes of micro-organisms which serve as antitoxins when applied to the soil.

In support of the above statement with respect to the difficulty in classifying the various micro-organisms found in decomposing animal matter, I refer to Section IV, Part II, of Sternberg's *Text Book of Bacteriology*, New York, 1901. That notwithstanding the complex changes taking place in animal matter during the process of putrefaction, I have demonstrated that in all cases and under all conditions there are present in the said matter the particular class or classes of micro-organisms which effect the result before stated, and when the same are provided with a proper food and incorporated with the soil they will render harmless the toxins produced as aforesaid, and I therefore prefer to base my invention on the use of the material carrying the micro-organisms rather than to identify the organisms by name or classification. That in carrying out my invention I prepare a sterilized culture-mixture, such as bouillon containing sugar and phosphate of potash, which will sustain the life of bacteria, and impregnate or inoculate the same by immersing therein, or adding thereto, decomposing animal matter, thus obtaining a pure culture of such bacteria as are found in the same, inclusive of those in the particular class which effect the result sought to be attained. That I then prepare a food for bacteria composed of ground raw bone, or some other suitable substance, and sterilize the same by heat or any analogous process, and then moisten the food with the pure culture described.

The material obtained by the method above set forth consists of a pure culture of the micro-organisms found in putrefying animal matter, together with a sterilized food for the same, and when the material is applied to the soil the micro-organisms thereby introduced, having a food adapted to sustain their life and activity, increase and multiply; and certain of them, in accordance with their peculiar functions discovered by me as above stated, render harmless the toxic emanations produced as aforesaid. The said materials may be used after the manner of a fertilizer, in its concentrated form, or it may be increased in bulk by addition thereto of sterilized phosphate rock, or some inert sterile filler, to any reasonable extent. That according to my researches, the micro-organisms contained in decomposing animal matter are not antagonistic to or destructive of the benign bacteria which in some manner promote plant life; and it is believed that should the soil embrace only the plant-food-producing micro-organisms described, and those herein mentioned as antitoxins, together with a proper food for the same, its fertility would be preserved for an indefinite period.

In the said pending applications, I have specified the various micro-organisms which I employ in carrying out my inventions, more particularly by their functions than by name and classification, for the reason that it is not uncommon for similar classes or sub-classes of micro-organisms to be known by different names arbitrarily given by bacteriologists in their discoveries of the same.

It will be understood that to increase the fertility of the soil and neutralize the toxins therein, in accordance with the inventions described in the filed applications, two or more distinct operations are necessary, and to obviate the necessity of such, I propose in the present application to go a step farther in the same line of invention, and produce a material in which all the beneficial results are attained by its use, as will hereinafter appear.

It will be remembered that in application Serial No. 492,289, I have referred specifically to toxins consisting of emanations from plants, and the excreta from the benign micro-organisms which in some manner promote fertilization and plant growth; but in the use of such terms I do not wish to be understood as affirming that all excreta from micro-organisms are in the strict sense of the term, toxins, as I believe that the same consist in part of compounds which are inert rather than poisonous, in that they merely do not support plant life; and my investigations lead me to the conclusion that the micro-organisms of putrefaction have also the property of so changing such inert matter, as to render it a useful element of the soil.

In carrying out the present invention I prepare, as stated in the filed applications, a pure culture of the various bacteria or micro-organisms mentioned in the said applications, and inoculate a suitable sterilized food for bacteria, such for instance as ground bone, with the said pure culture, in a manner similar to the methods described in the said applications, the new feature it will be understood, consisting in combining in a single fertilizing compound, plant-food producing micro-organisms, and toxin-neutralizing micro-organisms. By this method I am enabled to produce a substance which is applicable to all soils, that is to say,—a material which will meet the requirements in cases where reduced fertilization is caused by the lack of food-producing bacteria, the presence of inert compounds produced by the bacteria, or diseases due to toxic emanations from the plants.

From the foregoing it will be understood that in the pending applications from which I have made copious extracts, as well as in the present invention, there exists the same underlying, essential and distinctive principle of increasing and maintaining the fertilization of soils by the introduction thereto of a sterilized food which is inoculated with a pure culture of micro-organisms which have a beneficial effect on the growth and maintenance of plant life; and that in the application of the said material to the soil all harmful bacteria and poisonous fungi found in stable manure and in soils taken from infected farms are excluded; and as I believe that I am the first to apply the said novel principle in the fertilization of soils, and for the reason that in future investigations made by me, or by others in the same line of invention, wherein other micro-organisms may be found that could be advantageously added to those herein enumerated, and applied in the manner described, or which could be substituted therefor with practically the same results, I do not confine my invention to a fertilizer in which a sterilized food for bacteria is inoculated with the micro-organisms aforesaid, but reserve to myself the right to apply to the soil any arbitrarily selected beneficial micro-organisms, provided the same are combined with or carried by a sterilized food for the same.

I claim as my invention:—

1. The method of producing a commercial fertilizer which consists in providing a sterilized ground nitrogenous and substantially dry food for bacteria; then producing a sterilized culture-mixture; then inoculating the said culture mixture with arbitrarily selected micro-organisms having a preconceived beneficial effect on the soil, and then moistening the sterilized food with a pure culture of the said micro-organisms, substantially as specified.

2. The method of producing an improved material for the fertilization of soils, which consists in sterilizing ground bone; then producing a sterilized culture-mixture; then inoculating the said culture-mixture with arbitrarily selected micro-organisms having a preconceived beneficial effect on the soil; and then moistening the sterilized bone with the inoculated culture-mixture, substantially as specified.

LEONARD ROBERTS COATES.

Witnesses:
 Edw. P. Hill,
 Hugh L. Bond, 3d.